United States Patent [19]

Bilco

[11] 3,778,080

[45] Dec. 11, 1973

[54] LIFT TRUCK LOAD WHEEL ARRANGEMENT

[75] Inventor: Arthur Bilco, Greene, N.Y.

[73] Assignee: The Raymond Corporation, Greene, N.Y.

[22] Filed: May 15, 1972

[21] Appl. No.: 253,325

[52] U.S. Cl. .......................... 280/104.5 R, 280/81 R
[51] Int. Cl. .............................................. B60g 1/00
[58] Field of Search ............. 280/104.5 R, 104.5 A, 280/29, 81 R

[56] References Cited
UNITED STATES PATENTS
2,744,765  5/1956  Ferrier ........................ 280/104.5 R
2,193,567  3/1940  Pointer ........................ 280/104.5 A Primary Examiner—Philip Goodman
Attorney—Richard G. Stephens

[57] ABSTRACT

An arrangement for providing articulation of a lift truck load wheel pair without significantly increasing width or height of the truck leg supported by the pair, and without decreasing wheel size, comprises a pair of elongated rocker plates each carrying one end of a pair of wheel axles, with the rocker plates pivotally mounted in oversize openings in fixed side plates to rock against the faces of a pair of cams situated in the openings.

11 Claims, 4 Drawing Figures

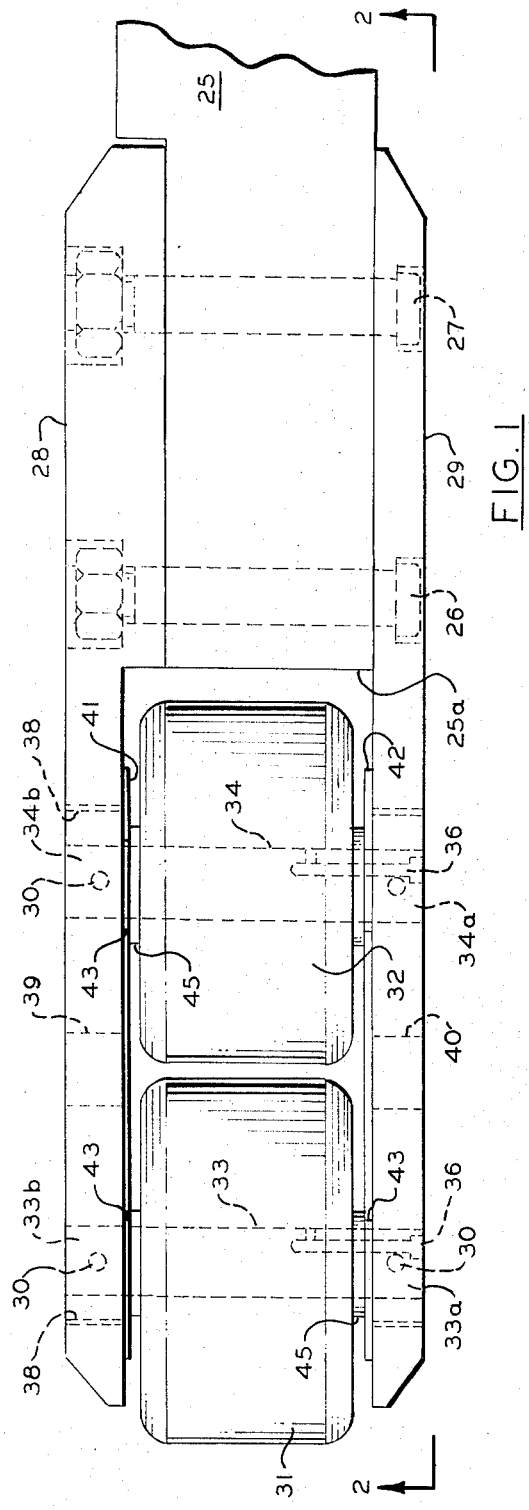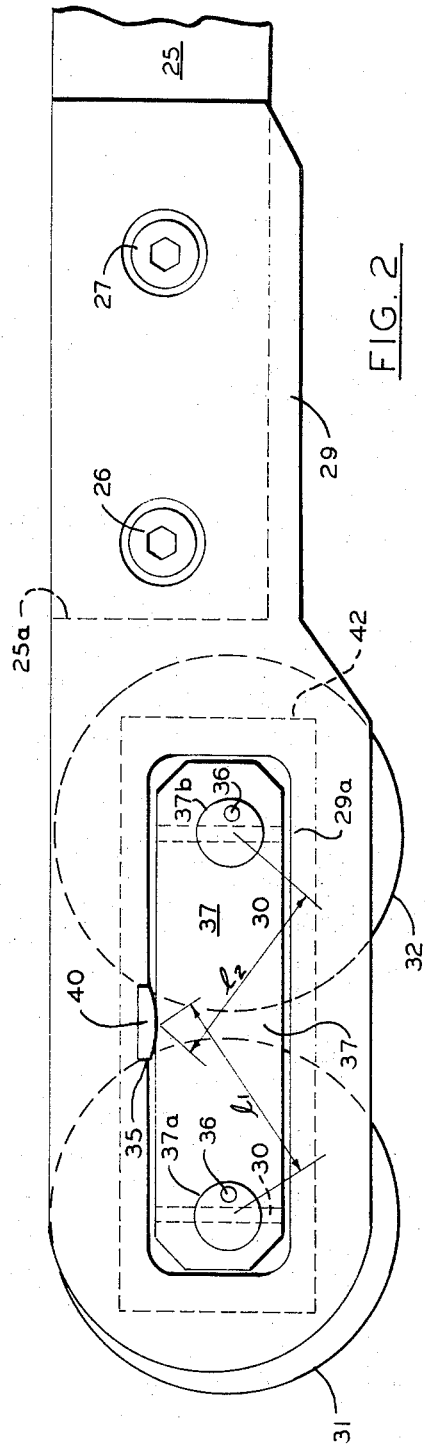

LIFT TRUCK LOAD WHEEL ARRANGEMENT

This invention relates to material-handling apparatus, and more particularly, to an improved load-wheel arrangement which results in markedly decreased wheel wear. A variety of lift trucks used in warehouses, factories and the like include a pair of outrigger "legs," or "arms," which extend generally horizontally forwardly from the base of the truck and are supported by load wheels. It is common practice to provide two load wheels in tandem to support each outrigger leg. For various reasons set forth more fully below, it is very important that both the widths and the heights of the outrigger legs be minimized, which in turn limits the widths and the diameters of the load wheels which may be used. Limiting the size of the load wheels limits, of course, the contact area between each load wheel and the floor. Inasmuch as a major part of the weight of a load, which might be 4000 pounds, for example, is imposed on the load wheels, the limited floor contact area results in extremely high unit stress in the portion of a load wheel contacting the floor, and also in great stress in other portions of the load wheels, so that the tire portions of such load wheels sometimes break loose from their felly, or hub portions. Even though very hard materials, such as polyurethane are commonly used as load wheel tires, rapid wear and deterioration, and thus frequent need for replacement of such load wheels, has plagued users of such trucks. A primary object of the present invention is to provide a lift truck load wheel arrangement that results in markedly reduced load wheel wear and deterioration.

It is perhaps readily apparent that load wheel wear and damage could be decreased, at least to some degree, by increasing the diameter and/or the width of each load wheel, so as to provide greater floor contact area, and hence less stress per unit area. However, a variety of considerations make it completely impractical to increase load wheel size in various applications, since, as mentioned above, such increases in load wheel size would require prohibitive increases in the width and/or height of the outrigger legs of the truck. One common form of truck frequently called a "straddle" truck, includes a mast fixed on the truck base frame, and a load carriage (with fork tines) movable up and down on the mast. To pick up a pallet (or stack of pallets) a straddle truck operator drives the truck up to the stack, so that the outrigger legs straddle the sides of the stack, at which time the forks extend into one pallet of the stack, which one depending upon how high the load carriage is then positioned on the mast. He then lifts up the pallet or stack and backs away. It is highly desirable that the outrigger legs of a straddle truck have minimum height even though those legs ordinarily straddle the load, so that such a truck can also be used with "wing-type" pallets having overhanging upper decks or load-carrying surfaces which extend beyond the outside runners of the pallets, with the outrigger legs then required to fit under the overhanging extensions to straddle the outer runners of the pallet. Minimum outrigger leg height is also necessary so that the outrigger legs will clear loads that overhang a pallet. While outrigger leg height could be increased if non-standard, higher pallets were provided, the expense of such pallets, the concomitant waste of warehouse space, and the need for higher racks or shelves, all make such a solution economically impractical.

It is highly desirable that the width of the outrigger legs of a straddle truck also be minimized in order to conserve warehouse space. When straddle trucks having outrigger legs 4 inches wide are used in warehouses, a 5-inch space is ordinarily left between adjacent stacks of pallets, so that a leg can enter between two stacks with a half-inch clearance on each side of the leg. If the widths of the outrigger legs are increased, adjacent stacks of pallets obviously must be spaced farther apart if adequate clearance is to be maintained, thereby wasting warehouse space. The width of the outrigger legs also generally affects the overall width of a straddle truck. While one theoretically could increase the outrigger leg widths without increasing the overall width of the truck, less space would then be left between the pair of outrigger legs, so that the trucks then could only handle narrower pallets. The overall truck width must be kept to a minimum for several reasons. For example, a minimum width is required if the truck is to be used in "drive-in rack" applications, and minimizing truck width allows the use of narrower aisles, conserving warehouse space. Thus a cardinal object of the present invention is to provide a load wheel arrangement which will markedly decrease load wheel wear, but which requires absolutely no increase, or very little increase in either the width or the height of the outrigger legs.

Another widely used form of lift truck comprises a base frame also having a pair of fowardly extending outrigger legs, but with a reach mechanism capable of moving the fork tines forwardly and rearwardly. The reach mechanism may comprise a lazy-tongs or scissors mechanism which moves the load carriage and fork tines relative to a mast fixed on the base frame, or alternatively may be a mechanism which moves the mast relative to the base frame. When a truck is equipped with either type of reach mechanism, it is at least sometimes unnecessary that the outrigger legs extend between adjacent stacks of pallets in order to straddle a pallet, but it is still highly desirable that outrigger leg width be minimized, and to minimize overall truck width. A third type of truck commonly used is a combination of the two basic types previously described in that its outrigger legs straddle the load as those of a straddle truck do, and its reach mechanism is extended to pick up or deposit a load in a two-deep stacking arrangement. Thus such a truck can straddle one stack of goods and reach over the top of that stack to pick up or deposit goods in a second higher stack behind the first stack. With each of these types of trucks, it is extremely desirable that outrigger leg height and width be minimized, and another object of the invention is to provide a load wheel arrangement which is applicable to each of the mentioned types of trucks. With each of these types of trucks, the center-of-gravity of the load is located very nearly directly over the load wheels during normal truck travel carrying a load, so that large forces are imposed on the load wheels.

Rapid load wheel wear has sufficiently plagued truck users that various attempts have been made to overcome it. Attempts to build more durable load wheels have not provided a solution. While the need for and advantages of minimizing outrigger leg heights and widths are well-recognized, and while structural members of reduced height and width which can readily carry the loads involved have been available for use as outrigger legs, the industry has been unable to reduce the size of outrigger legs because of the limitations of available load wheels.

Another prior art attempt to decrease load wheel wear can be mentioned. In some prior art lift trucks of the types mentioned, the outrigger arms extend slightly downwardly as they extend outwardly from the truck, so that the rear load wheel of a tandem pair on an outrigger leg tends to lie higher, slightly off the floor, with the front wheel of the pair taking the entire load, when the truck is unloaded, and so that the upward flexing of the outrigger leg relative to the truck base when the truck is loaded tends to raise the front wheel of the pair relative to the rear wheel of the pair, and cause both wheels of the tandem pair to support a portion of the load. While such downward canting of the outrigger legs may provide some decrease in load wheel wear in some applications, load wheel wear has remained a serious problem, and with such an arrangement, the forward wheel of each tandem pair usually wears out considerably more quickly than the rear wheel of each pair. Another object of the present invention is to provide a load wheel arrangement, which, in addition to not requiring larger load wheels, does not depend upon outrigger leg deflection in order to decrease load wheel wear. In the prior art system described it is important to recognize that the front load wheels tend to carry a large percentage of the entire load when the truck is unloaded, with the rear load wheels carrying larger fractions of the load as the load carried by the truck is increased. Inasmuch as the fraction of the load which each wheel of a pair will carry depends upon the amount of outrigger leg deflection upwardly, and since that deflection depends upon the weight of the load carried by the truck, it will be seen that the load will be distributed equally between the two wheels of a tandem pair only when a particular weight load is being carried. Inasmuch as usual truck applications require a wide range of loads to be carried, with the truck sometimes carrying no load, sometimes carrying a maximum load, and frequently carrying many different weight loads, it will be seen that one load wheel or the other of a prior art tandem pair will ordinarily be carrying more load than the other wheel of the pair.

With a given load carried by the truck, it should be recognized that the minimum possible load will be imposed on each wheel of a tandem pair if the two wheels of the pair can be arranged to share the load equally even when the truck passes over uneven or rough floors. Thus it is an object of the invention to provide an outrigger leg load wheel arrangement wherein the wheels of a pair share the load equally, and importantly, where they do so irrespective of the weight of the load carried by the truck, and further, that the arrangement require no increase or a minimum increase in load wheel size or outrigger leg size.

In accordance with a central concept of the invention, the pair of tandem load wheels which support each outrigger leg are arranged to freely pivot about a horizontal lateral axis through a limited angular distance, about a pivot point centered substantially equally between the axles of the wheel pair, so that the wheel pair automatically rotates to distribute the load on the outrigger leg equally between the two wheels of the tandem pair, and the manner in which such a wheel pair is mounted for such pivotal movement without significantly increasing leg width or decreasing wheel size is a principal feature of the invention. The use of wheel pairs which can rock or pivot as a pair is not novel per se, but the known prior art arrangements which permit such operation provide no solution to the problem of wheel wear solved by the present invention, since they utilize yokes, shafts, links or the like which require either increases in leg width or height or decreases in wheel size. Thus it is a primary object of the present invention to provide a load wheel assembly wherein the arrangement allowing rocking movement or articulation of a wheel pair need not add significantly to the width or height of the assembly and need not require use of smaller wheels.

As will be seen below, each wheel pair may be arranged also to allow small amounts of sliding longitudinal movement as well as pivoting. It is clear that the pivoting motion allows the wheels of a pair to share the load equally, markedly decreasing wheel wear. It is believed that the small amount of sliding longitudinal movement may also contribute significantly to reduced wheel wear, and a further object of the invention is to provide an improved lift truck load wheel arrangement wherein a load wheel pair may move longitudinally relative to a truck outrigger leg by small amounts.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a top view of a portion of an outrigger leg incorporating the load wheel arrangement of the present invention.

FIG. 2 is a side elevation view taken at lines 2—2 in FIG. 2.

Figure 3:
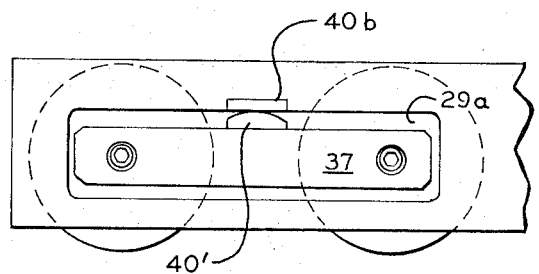
FIG. 3 is view similar to FIG. 2 of a modified form of the invention.

Referring to FIGS. 1 and 2, the outrigger leg shown therein includes a rear portion 25 shown cutoff, which connects to the truck base frame (not shown) in conventional fashion. In typical application the rear portions of the outrigger legs connecting to the base frame comprise solid bar stock. In the device of FIGS. 1 and 2, the rear or base portion of the outrigger leg extends forwardly to terminate at 25a. A pair of heavy shoulder bolts 26,27 clamp inside and outside wheel plates 28 and 29 to the sides of the outrigger leg. The wheel plates 28,29 each extend forwardly from the end of leg 25 and support a pair of load wheels 31,32 in a manner to be described. It will be apparent that in some applications of the invention one or both side plates 28,29 could comprise integral portions of the outrigger leg.

Wheels 31,32 each comprise a hard plastic (e.g., polyurethane) tire portion rotatably mounted on an axle, 33 or 34, respectively. A grease fitting 36,36 is provided in one end of each axle so that lubrication may be introduced between the tire and axle of each load wheel. The outer ends 33a, 34a of axles 33,34 are mounted in holes 37a, 37b in outside rocker plate 37, and the inner ends 33b, 34b of the axles are similarly mounted in holes in inside rocker plate 38, each end of the axles being pinned in position in one of the rocker plates by a pin 30 which passes through the axle end and the rocker plate. Rocker plates 37 and 38 are pivotally situated in openings 28a and 29a provided in wheel plates 28 and 29, only opening 29a being visible in the drawings, and opening 28a being similar. The top of each rocker plate bears against the arcuate lower surface of a respective hardened-steel rocker cam piece 39 or 40 which extends downwardly into one of the wheel plate openings and is staked or otherwise affixed in place in a slot 35. Thrust plates 41,42 cover the sides of openings 28a, 29a adjacent the wheels, and the axles pass through holes in thrust plates 41,42 so that those plates may move up and down with the axles and wheels. However, it is not necessary that thrust plates 41,42 move with the axles and wheels, and they may be rigidly affixed to the wheel plates 28,29 if the holes in plates 41,42 through which the axles pass are enlarged to allow the axles to move up and down relative to the side plates. Spacer washers 45,45 act as lateral spacing means on each side of each wheel, maintaining each wheel laterally centered between thrust plates 41,42 and between wheel plates 28,29. Thus the assembly comprising wheels 31,32, rocker plates 37,38 and thrust plates 41,42 is constrained against lateral movement (i.e., up and down as viewed in FIG. 1) but enabled to rock or pivot, about a horizontal axis passing through corresponding points on rocker cam pieces 39 and 40, through a limited range of angles, until the rocker plates strike inner edges of the resepctive wheel plate openings 28a, 29a in which they are situated. More precisely, it will be seen that by using arcuate cams as shown, the horizontal axis about which pivoting occurs moves very slightly forwardly and rearwardly as the assembly pivots clockwise or counterclockwise as viewed in FIG. 2. It will be seen that the amount by which the length of openings 28a, 29a exceeds the lengths of rocker plates 37,38 also determines and limits the distance which the rockable assembly can move longitudinally (i.e., left-right in FIGS. 1 and 2). In ordinary practice longitudinal motion is limited to a very small amount, and the rocker cam pieces 39 and 40 are located substantially midway between the ends of openings 28a, 29a, so that the lever arm distances $l_1$, $l_2$ between each axle and the pivot axis on the rocker cams remain very nearly equal, thereby insuring that the assembly will always rotate until very nearly equal forces act between the floor and each wheel of the tandem pair, and hence, so that for a given load, minimum forces are applied to each wheel. As the truck moves forwardly, the rear ends of rocker plates 37,38 tend to lie against the rear ends of openings 28a, 29a, and as the truck moves rearwardly, the front ends of rocker plates 37,38 tend to lie against the front ends of openings 28a, 29a.

As a truck using the disclosed load wheel mounting arrangement passes over rough or uneven floors, it will be appreciated that a wheel pair will pivot about the axis passing through the points where rocker plates 37,38 engage the faces of cams 39,40, thereby distributing the load equally between the two wheels of the pair, thereby minimizing the load applied to either wheel of the pair, and consequently reducing wheel wear.

When the front wheel of a forwardly-moving truck or the rear wheel of a rearwardly-moving truck encounters a rise, pebble or other floor obstruction, there is a component of force tending to push the wheel rearwardly or forwardly, as the case may be, and the freedom of the wheel pair to slide very slightly longitudinally can be seen possibly to tend to decrease the shock forces applied to the wheels under such conditions, further decreasing wheel wear.

In typical warehouse applications, only a very small angular rocking of the load wheel assemblies need be provided to provide marked increase in wheel life. In a typical application for a lift truck having a 4000-pound rated load capability and using 5-inch diameter load wheels approximately 3 inches wide, marked increase in wheel life was obtained by merely allowing the rocker plates to rock upwardly or downwardly no more than about 6° from a centered level position, with one wheel of a tandem pair allowed to move a maximum of ⅛ inch upwardly while the other moved an equivalent amount downwardly. In typical applications, each pair of loqd-wheels is approximately 4 or 5 feet forward from the wheels supporting the base of the truck, and the two load wheels on a given outrigger leg are mounted close together, on say 5 ½-inch centers when 5-inch diameter load wheels are used. It will be seen that with such an arrangement, even a maximum rocking of the rocker plates, so that one wheel rises ⅛ inch and the other lowers that amount, will cause an extremely small amount of pitching of the outrigger legs and the truck, an amount so small as to be negligible, and the outrigger arm height above the floor will not change appreciably. The openings 28a, 29a in the wheel plates were made only slightly longer than the rocker plates, thereby limiting total longitudinal shifting of the assemblies to no more than about 0.050 inch.

FIG. 3 illustrates in simplified form an alternative arrangement which corresponds to that of FIGS. 1 and 2 except that the hardened cams (only one 40' of which is visible in FIG. 3) are carried on the rocker plates rather than the side plates, and their arcuate faces are convex upwardly rather than convex downwardly. A hardened steel insert 40b may be provided along the edge of the opening to engage cam 40' if desired. Analogously, similar inserts (not shown) may be provided along the upper edges of rocker plates 37,38 in FIGS. 1–2, if desired. It will be apparent that the device of FIG. 3 will function similarly to that of FIGS. 1 and 2.

Figure 4:
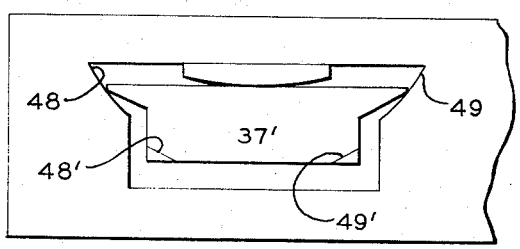
FIG. 4 is a view similar to FIG. 2 illustrating a further modified form of the invention.

While the systems shown in FIGS. 1, 2 and 3 allow small amounts of sliding longitudinal shifting of the wheel pair relative to the outrigger leg, the alternative arrangement shown in FIG. 4 allows pivoting without sliding longitudinal movement relative to the cams. Inasmuch as the rocker plates roll on the faces of the cams in FIG. 3, a small longitudinal movement of the rocker plates and wheels inherently occurs as pivoting occurs, but in FIG. 4 the openings are shaped relative to the ends of the rocker plates so that sliding of the plates relative to the cams is prevented.

In FIG. 2 as the rocker plates pivot on the face of their respective cams, each rocker plate moves very slightly forwardly or rearwardly in the sense that its center-of-gravity moves very slightly forwardly or rearwardly. The path of the center-of-gravity of each rocker plate is known in engineering mechanics as a prolate trochoid, assuming the cam surface is truly arcuate, i.e., circular, and the longitudinal displacement $x$ of the center-of-gravity of each rocker plate is described by the equation: $x = a\theta - b \sin \theta$ where $\theta$ is the angular rotation of the plate from a level condition, a is the cam radius, and $b$ is the distance of the rocker plate C.G. below the cam when the rocker plate is level. The rocker bar centers-of-gravity also move very slightly upwardly through distance, $y$, where: $y = b(1-\cos \theta)$. The above assumes that the rocker plates are not allowed to slip on the faces of their cams, and while the device of FIGS. 1 and 2 allows a small amount of slipping, it is possible and within the scope of the invention to provide no slipping. In FIG. 2, the path which an upper corner of rocker plate 37 describes relative to cam 40 as the rocker plate rotates is that of an involute to a circle having a radius corresponding to that of the cam. If the opening of the assembly is provided with a pair of involute surfaces such as those shown at 48 and 49 in FIG. 4, and if the lower corners of the rocker plates are cut back as shown on plate 37' to provide clearance, the upper corners of the rocker bar will engage the involute surfaces, and the plate will roll on the face of the cam without any sliding relative to the cam. It is not necessary that corners per se of the plate engage such surfaces. The corners may be rounded, and portions other than the top corners may slidingly engage the surfaces if surfaces differing slightly from classical involutes are used. It now will be readily apparent that desired rocking motion also may be obtained by providing appropriately curved surfaces at the bottoms of the rocker plates, as by shaping the bottom of plate 37' in FIG. 4 as suggested by dashed lines 48', 49', and by appropriately shaping the cooperating surfaces of the opening so that the surfaces of plate 37' slide along the opening surfaces as the rocker bars pivot.

It will be apparent that the curvature of cams 39 and 40 is not limited to precisely arcuate (circular) forms, and that numerous other shapes will still accomplish the objectives of the invention. Axles 33 and 34 each can be fastened on one end only in some embodiments of the invention, or otherwise retained in the rocker plates. Thrust plates 41,42 communicate thrust loads from the wheels to the wheel plates. These thrust plates are large enough to generously overlap the holes in the wheel plates and to communicate thrust loads by rubbing on the wheel plates. It will be apparent that large round washers or various other shapes which would similarly communicate thrust loads to the wheel plates may be used, and if desired, the thrust plates may comprise integral portions of rocker plates 37,38.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A material-handling vehicle load-wheel mounting arrangement for supporting a leg extending substantially horizontally from the vehicle base, comprising, in combination: a pair of spaced side plates affixed to said leg, each of said side plates containing an opening; a pair of cam means, each of said cam means having a cam surface situated within a respective one of said openings; a pair of rocker plates each situated within a respective one of said openings, said openings being large enough to allow limited rocking movement of the rocker plate situated therein against the cam surface of the cam means situated therein; and a pair of wheels each having an axle, one end of each axle being fastened in one of said rocker plates and the other end of each axle being fastened in the other of said rocker plates.

2. An arrangement according to claim 1 having a pair of further plate means interposed between said side plates and said wheels, with said axles passing through holes in said pair of further plate means.

3. An arrangement according to claim 1 wherein each of said cam means is substantially equidistant from both of said axles.

4. An arrangement according to claim 1 wherein said cam means are affixed to said side plates.

5. An arrangement according to claim 1 wherein said cam means are affixed to said rocker plates.

6. A load wheel assembly, comprising, in combination: a pair of wheels spaced apart in a first direction, each of said wheels having an axle extending in a second direction perpendicular to said first direction; a first rocker plate extending in said first direction and connected to said axles on one side of said wheels; a second rocker plate extending in said first direction and connected to said axles on the other side of said wheels; and a pair of plate means spaced apart in said second direction, each of said plate means having an opening to accommodate a respective one of said rocker plates and allow limited pivotal movement thereof.

7. An assembly according to claim 6 having cam means situated within each said opening providing a fulcrum on which said rocker plates may pivot.

8. An assembly according to claim 7 wherein said cam means are carried on said plate means and include downwardly convex surfaces engaging upper edges of said rocker plates.

9. An assembly according to claim 7 wherein said cam means are carried on said rocker plates and include upwardly convex surfaces engaging upper edges of said openings.

10. An assembly according to claim 7 wherein said cam means are substantially equidistant from said axles.

11. An assembly according to claim 7 having further means spaced between said rocker plates and said wheels to fix the position of said rocker plates in said second direction.

* * * * *